United States Patent
Carrier et al.

(10) Patent No.: US 10,754,659 B2
(45) Date of Patent: *Aug. 25, 2020

(54) DYNAMICALLY GENERATING A SERVICE PIPELINE COMPRISING FILTERED APPLICATION PROGRAMMING INTERFACES

(71) Applicant: International Business Machines Corporation, Armonk, NY (US)

(72) Inventors: Scott R. Carrier, Apex, NC (US); Jennifer L. La Rocca, Rochester, MN (US); Mario J. Lorenzo, Miami, FL (US); Mark G. Megerian, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,309

(22) Filed: Oct. 31, 2018

(65) Prior Publication Data

US 2019/0065040 A1 Feb. 28, 2019

Related U.S. Application Data

(63) Continuation of application No. 15/474,058, filed on Mar. 30, 2017, now Pat. No. 10,558,467.

(51) Int. Cl.
*G06F 9/44* (2018.01)
*G06F 16/9535* (2019.01)
(Continued)

(52) U.S. Cl.
CPC .............. *G06F 9/44* (2013.01); *G06F 8/34* (2013.01); *G06F 9/451* (2018.02); *G06F 16/9535* (2019.01); *G06F 40/169* (2020.01)

(58) Field of Classification Search
CPC .. G06F 9/44505; G06F 9/454; G06F 16/9535; G06F 17/248; G06F 17/241; G06F 9/44; G06F 9/451
See application file for complete search history.

(56) References Cited

U.S. PATENT DOCUMENTS 9,026,608 B1  5/2015  Goldband et al.
9,258,274 B2  2/2016  Hansen
(Continued)

OTHER PUBLICATIONS

List of IBM Patents or Patent Applications Treated as Related, Jul. 17, 2019, 2 page.

(Continued)

*Primary Examiner* — Tuan C Dao
(74) *Attorney, Agent, or Firm* — Reza Sarbakhsh; Edell, Shapiro & Finnan, LLC (57) ABSTRACT

According to an embodiment of the present invention, a system filters a collection of application programming interfaces based on input data representing information of a document to be processed, and generates a pipeline of filtered application programming interfaces. Each filtered application programming interface is sequentially executed within the pipeline. The document may be processed through the pipeline and visualizations based on the processing of the document may be generated, allowing the pipeline to be refined to produce desired output data selected within the visualizations. Embodiments of the present invention further include a method and computer program product for generating a pipeline of filtered application programming interfaces in substantially the same manner described above.

6 Claims, 7 Drawing Sheets

(51) Int. Cl.
*G06F 8/34* (2018.01)
*G06F 9/451* (2018.01)
*G06F 40/169* (2020.01)

(56) References Cited

U.S. PATENT DOCUMENTS

| | | | |
|---|---|---|---|
| 9,262,183 | B2 | 2/2016 | Liensberger et al. |
| 9,823,950 | B1 | 11/2017 | Carrier et al. |
| 2005/0246726 | A1 | 11/2005 | Labrou et al. |
| 2008/0018652 | A1* | 1/2008 | Toelle ................... G06T 15/005 345/506 |
| 2008/0141273 | A1 | 6/2008 | Borgendale |
| 2009/0150168 | A1 | 6/2009 | Schmidt |
| 2009/0240774 | A1 | 9/2009 | Sachtjen et al. |
| 2009/0327277 | A1 | 12/2009 | Sanborn et al. |
| 2010/0214599 | A1* | 8/2010 | Zhan ...................... G06F 3/1246 358/1.15 |
| 2012/0060216 | A1 | 3/2012 | Chaudhri et al. |
| 2014/0136937 | A1 | 5/2014 | Patel et al. |
| 2014/0280253 | A1 | 9/2014 | Clark et al. |
| 2014/0337372 | A1 | 11/2014 | Lee et al. |
| 2014/0344422 | A1 | 11/2014 | Ferris et al. |
| 2015/0128103 | A1* | 5/2015 | Stratton .................... G06F 8/00 717/100 |
| 2015/0128156 | A1 | 5/2015 | Zhu et al. |
| 2015/0161104 | A1* | 6/2015 | Buryak ................ G06F 40/263 704/8 |
| 2015/0169385 | A1 | 6/2015 | Allen et al. |
| 2015/0186193 | A1 | 7/2015 | Jain et al. |
| 2015/0200955 | A1 | 7/2015 | Martin |
| 2015/0277900 | A1 | 10/2015 | O'Keeffe et al. |
| 2015/0379429 | A1* | 12/2015 | Lee ......................... G09B 5/00 706/11 |
| 2016/0057107 | A1 | 2/2016 | Call et al. |
| 2016/0092046 | A1 | 3/2016 | Hong et al. |
| 2019/0339982 | A1 | 11/2019 | Carrier et al. |

OTHER PUBLICATIONS

Guest Post: Why the Api Pattern Is Broken and How We Can Fix I, May 2015, pp. 2-5, retrieved from Internet Aug. 11, 2016: http://apievangelist.com/2015/05/05/guest-post-why-the-api-pattern-is-broken-and-how-we-can-fix-it/.

Monad (functional programing), Wikipedia, the free encyclopedia, pp. 1-16, retrieved from Internet Aug. 11, 2016: https://en.wikipedia.org/wiki/Monad_%28functional_programming%29.

Rubel, API Chaining, Oct. 2015, pp. 1-4, retrieved from Internet Aug. 11, 2016: https://github.com/orubel/grails-api-toolkit-docs/wiki/API-Chaining#api-chain-examples.

Rubel, API Abstraction & API Chaining in Grails, Sep. 2014, pp. 1-5, retrieved from Internet Aug. 16, 2016: http://www.slideshare.net/bobdobbes/api-abstraction-api-chaining.

What are idempotent and/or safe methods?, 4 pages, retrieved from Internet Aug. 12, 2016: http://restcookbook.com/HTTP%20Methods/idempotency/.

Rubel, API Chaining (Part 2) : The API Chain, Mar. 2014, 3 pages, retrieved from Internet Aug. 12, 2016: https://www.youtube.com/watch?v=O4qNQUhxcRg.

Carrier et al., "Dynamically Forming and Executing Application Programming Interface Pipelines", U.S. Appl. No. 15/237,756, filed Aug. 15, 2016, 50 pages.

List of IBM Patents or Patent Applications Treated as Related, Nov. 2018, 2 page.

* cited by examiner

DYNAMICALLY GENERATING A SERVICE PIPELINE COMPRISING FILTERED APPLICATION PROGRAMMING INTERFACES

CROSS-REFERENCE TO RELATED APPLICATIONS

This application is a continuation of U.S. patent application Ser. No. 15/474,058, entitled "DYNAMICALLY GENERATING A SERVICE PIPELINE COMPRISING FILTERED APPLICATION PROGRAMMING INTERFACES" and filed Mar. 30, 2017, the disclosure of which is incorporated herein by reference in its entirety.

BACKGROUND

1. Technical Field

Present invention embodiments relate to computer systems, and more specifically, to dynamically forming and customizing a pipeline (or sequence) of application programming interfaces (API) (e.g., providing services or portions thereof) to be executed by one or more computer systems.

2. Discussion of the Related Art

Cognitive systems are evolving towards a micro-service architecture that publishes and catalogues an ecosystem of service APIs. These service APIs are each designed to perform a specific function, where the service API functions may be combined to form complex operations or services that produce an overall result. The combination of service API functions may be accomplished (e.g., via API chaining) by hard-coding (and compiling) the desired sequence of service APIs and the specific data passing between them. However, as the number of catalogued service API functions grows, consumers of the API services may not be aware of all of the capabilities of the different services, and evaluating each service individually to determine its value relative to their individual needs becomes increasingly complex.

SUMMARY

According to an embodiment of the present invention, a system filters a collection of application programming interfaces based on input data representing information of a document to be processed, and generates a pipeline of filtered application programming interfaces. Each filtered application programming interface is sequentially executed within the pipeline. The document may be processed through the pipeline and visualizations based on the processing of the document may be generated, allowing the pipeline to be refined to produce desired output data selected within the visualizations. Embodiments of the present invention further include a method and computer program product for generating a pipeline of filtered application programming interfaces in substantially the same manner described above.

DETAILED DESCRIPTION

Present invention embodiments dynamically form and customize an API service pipeline. Initially, a user uploads representative data to a server, which receives and analyzes the representative data to identify one or more primary classifications and/or one or more sub-classifications associated with the representative data. The server may use the classifications to form an API pipeline, initially comprising one or more APIs relevant to the classifications associated with the representative input data. Each API in the API pipeline is executed by one or more computer systems to process an input document such that the results from each API in the pipeline are aggregated and provided in a response object that is displayed on a client system for a user to review. Based on the response object, the user may determine whether to refine the API pipeline, e.g., by adding and/or removing one or more service APIs, to produce a tailored API pipeline customized to the subjective needs of the user.

Present invention embodiments further enable APIs (e.g., providing services or portions thereof) to be registered in a registry and/or a service catalog, and readily assembled in various combinations to form an API pipeline (or sequence) that may be refined to be customized to a consumer's specific requirements. For example, a server may use a service catalog of APIs to construct pre-defined templates of API sequences that may be relevant for different classifications of input data. This provides rapid assembly and evaluation of any quantity of APIs (e.g., NLP, etc.) within a browser. Based on an evaluation of the output generated by an API pipeline, a consumer may refine the API pipeline by adding and/or removing one or more of the service APIs within the pipeline definition.

The underlying APIs within the pipeline can optionally act upon data returned by upstream APIs and/or simply pass the data through to subsequent APIs (or nodes) within the pipeline. Domain-specific pipeline templates (e.g., NLP, etc.) may be provided to ease consumption and expedite time-to-value (e.g., NLP pipeline templates for base medical, oncology, clinical trials, etc.). The templates of API sequences may be suitable for accomplishing higher-level tasks, where consumers or users can readily tailor these pipeline templates to accommodate their needs.

Present invention embodiments employ an extensible common object model combined with a custom serializer/ deserializer to allow APIs of a pipeline to extract specific classes from a request object derived from an aggregated response object produced by a prior API of the pipeline. Classes within the request object unknown to an API in the pipeline (e.g., the class in the request object is not in a classpath of the API) are passed-through to the next API (or node) in the pipeline. Present invention embodiments provide support for both unstructured and structured containers, thereby enabling disparate (e.g., NLP and non-NLP) APIs (or services) to participate within a pipeline.

Present invention embodiments employ a key-based approach for API registration and pipeline definition. The ordering of API keys within a pipeline definition indicates a flow order (of APIs) for pipeline processing. A pipeline key is a uniform resource locator (URL) endpoint to which requests may be sent for the pipeline (e.g., via an HTTP POST method). Underlying APIs within a pipeline definition can be modified (e.g., exchanged, mixed, matched, etc.) without any disruption to callers of the pipeline manager API (e.g., since the pipeline key serving as the URL endpoint for the pipeline remains the same).

Present invention embodiments may employ stackable Representational State Transfer (REST) APIs, where downstream APIs within a pipeline build upon output of upstream APIs within the pipeline. Further, downstream APIs within a pipeline can also dynamically add context to objects within the aggregated response object (of the common object model) provided by upstream APIs. In addition, present invention embodiments may dynamically pass global and API-specific, name-spaced endpoint and query strings to be appended to the underlying APIs within a pipeline definition.

APIs or services may be combined in various manners. For example, Unstructured Information Management Architecture (UIMA) is a component software architecture for multi-modal analytics for analyzing unstructured information. UIMA specifies component interfaces in an analytics pipeline. However, UIMA requires up-front designation of a typesystem definition for every annotation type (including its attributes/features) produced by annotators participating within a pipeline. Present invention embodiments avoid this required restriction. Further, UIMA enforces the use of an interface around a common object model (e.g. implementing a process( ) method), as well as both aggregate and primitive descriptors. Present invention embodiments employ a common object model without an API around it that must be implemented (e.g., no process( ) method), nor do present invention embodiments require descriptors (e.g., defining an import of Extensible Markup Language (XML) type definitions).

A further example of combining APIs or services includes a mashup which is a web page, or web application, that utilizes content from a plurality of sources to create a single new service displayed in a single graphical user interface. Depending on the type of mashup and the APIs involved, the consumer must be cognizant of the inputs and outputs of each API involved in the mashup. In other words, a consumer needs to satisfy and route the proper inputs to each API in the mashup and aggregate the outputs themselves.

Yet another example of combining APIs or services includes Business Process Management (BPM) that facilitates the routing of data through a quantity of APIs or business processes. However, consumers need to be cognizant of inputs and outputs, and data is aggregated outside of an object model flowing through the APIs. In addition, BPM incurs significant overhead, and targets general orchestration of not only code, but business processes.

In contrast to these examples, present invention embodiments provide several advantages. For example, each API of a present invention embodiment honors a common object model and adheres to a verbose mode of operation (e.g., data present in a request is passed through in a corresponding response (for downstream APIs)). Since inputs/outputs for all of the APIs honor the common object model, no wiring (e.g., cognizance or routing of data) is required for the inputs/outputs by the consumers. The common object model of a present invention embodiment further handles aggregating data across multiple APIs. Consumers of a pipeline of APIs receive an aggregate response object from the pipeline request. APIs within a pipeline are readily interchangeable, and a consumer can declare any order dependence between APIs within a pipeline, enabling the consumer to make further refinements to the pipeline. APIs lacking order dependence may be processed concurrently or in parallel. No programming or integration code is necessary to achieve this capability.

Figure 1:
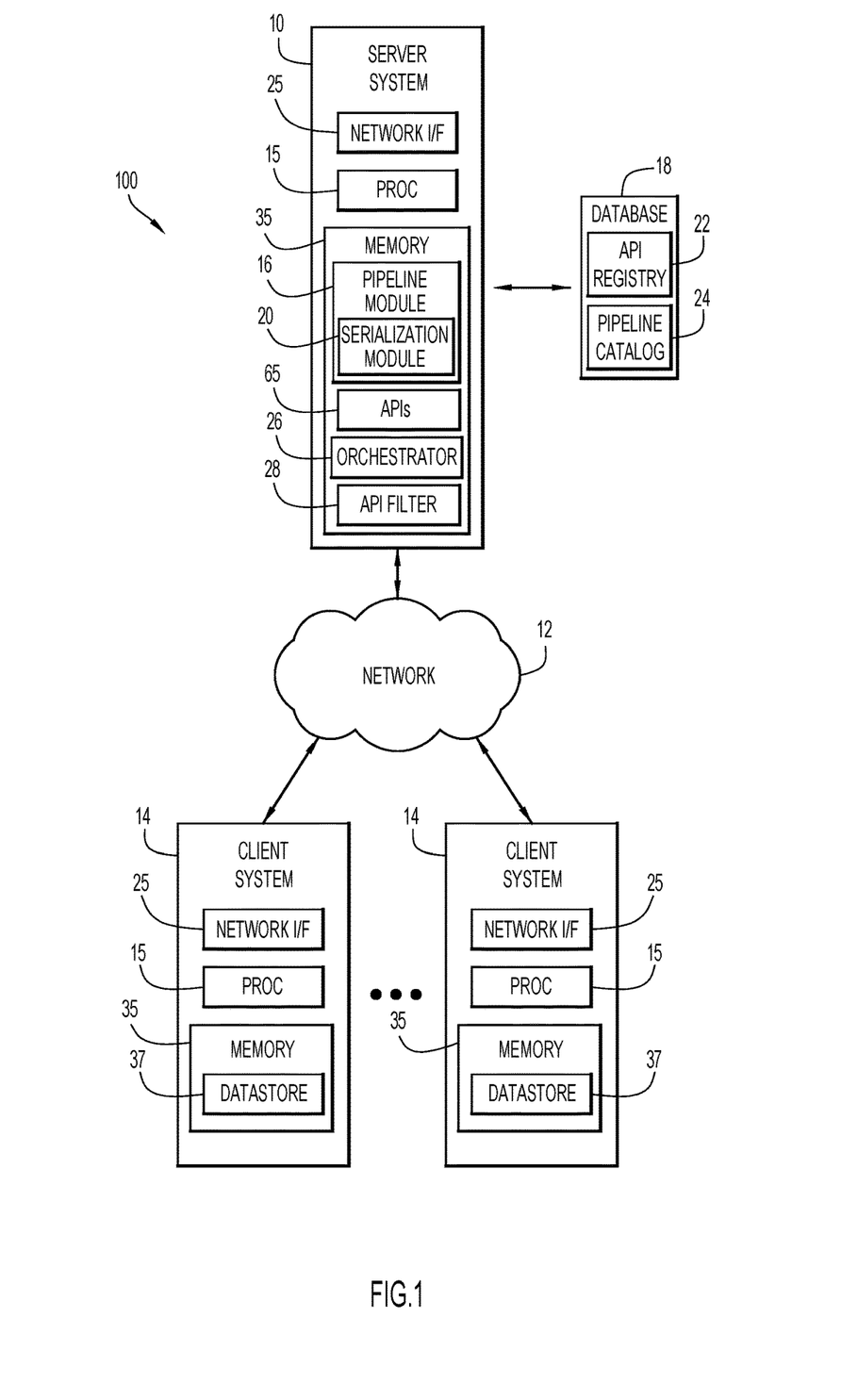
FIG. 1 is a diagrammatic illustration of an example computing environment for use with an embodiment of the present invention.

An example computing environment for use with a present invention embodiment is illustrated in FIG. 1. Specifically, the computing environment includes one or more server systems 10 and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to submit requests and/or commands to server systems 10 to register APIs, define and execute various API pipelines, and receive corresponding results. Server systems 10 include a pipeline module 16 to implement a pipeline manager API 250 (FIG. 2) that registers APIs with the system, and defines and executes API pipelines (or sequences) as described below. The pipeline module includes a serialization module to accommodate the data needs of the various APIs within a pipeline (with respect to a common object model utilized by the APIs of the pipeline to provide pipeline results). Further, server systems 10 may each include one or more APIs 65 to enable the pipelines to use any quantity of local and/or remote APIs, an orchestrator 26 for identifying one or more API pipeline templates relevant to representative input data and/or searching one or more pre-defined catalogues of registered APIs for one or more service APIs appropriate for processing the representative input data, and an API filer 28 for identifying one or more classifications and/or one or more sub-classifications associated with the representative input data.

A database system 18 may store various information, and include an API registry 22 and a pipeline catalog 24. API registry 22 contains information for a collection of APIs registered with the system (e.g., a URL and a key for a registered API), while pipeline catalog 24 contains pipeline definitions that indicate, for each corresponding pipeline, the APIs (e.g., from the collection of APIs in API registry 22) in that pipeline (e.g., based on API keys) and their order of execution. The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.)

or other interface (e.g., command line prompts, menu screens, etc.) to solicit information from users pertaining to the APIs and pipelines, and may provide reports including pipeline results.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, pipeline module, serialization module, APIs, browser/interface software, orchestrator, API filter, etc.).

The pipeline, serialization, orchestrator and API filter modules may include one or more modules or units to perform the various functions of present invention embodiments described below. The various modules (e.g., pipeline module, serialization module, APIs, orchestrator, API filter, etc.) may be implemented by any combination of any quantity of software and/or hardware modules or units, and may reside within memory 35 of the server systems for execution by a corresponding processor 15. Datastore 37 within memory 35 of client systems 14 may further store user and/or pipeline data (e.g., user identification data, representative input data, keys for registered APIs, etc.). By way of example, a present invention embodiment may pertain to APIs in the form of cognitive micro-services that run within a multi-tenant cloud computing environment. However, any type of API and computing environment may be utilized.

Figure 2:
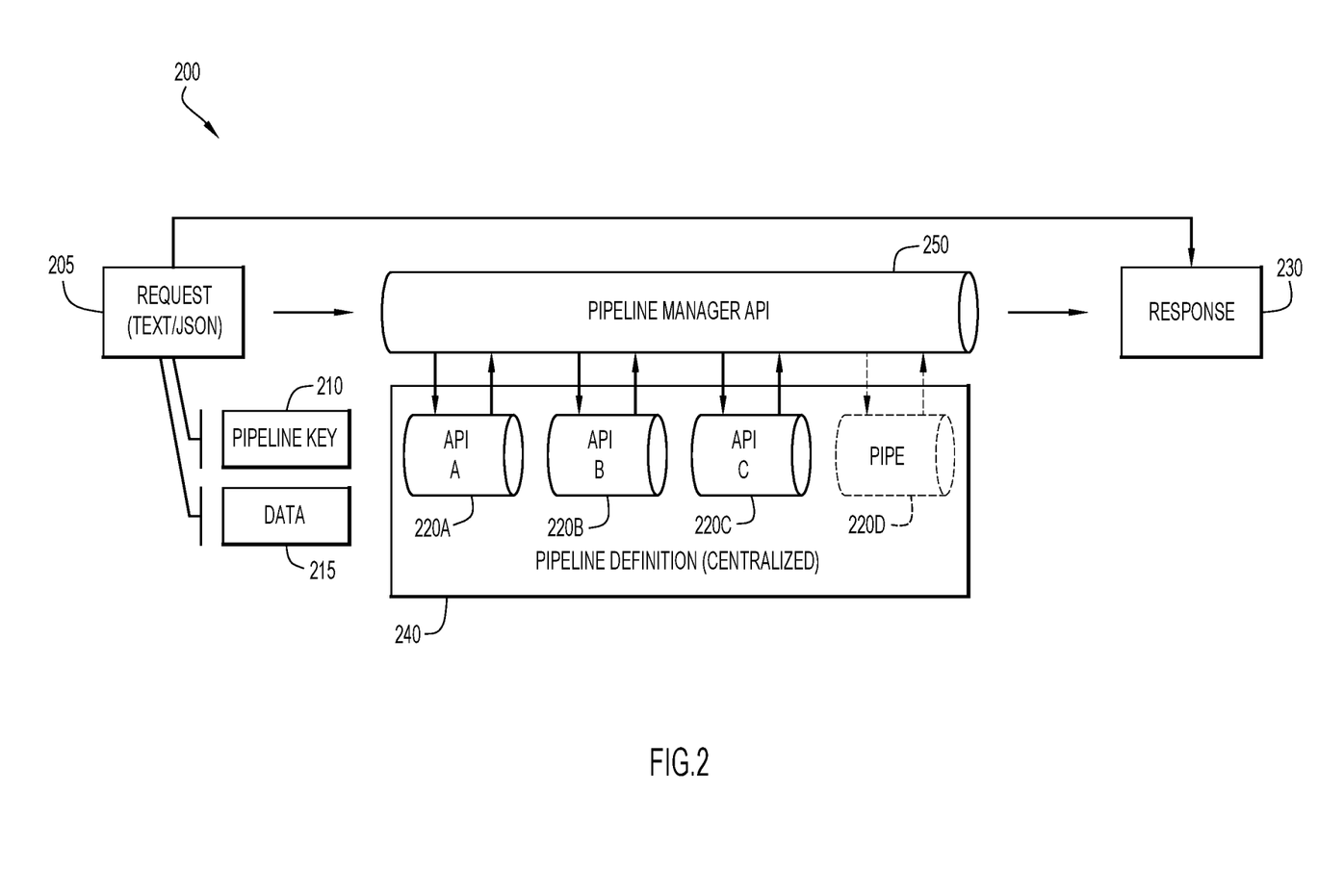
FIG. 2 is a flow diagram of a pipeline manager API processing input data in an API pipeline according to an embodiment of the present invention.

Referring to FIG. 2, pipeline manager API 250 (e.g., implemented via one or more server systems 10 and pipeline module 16) processes requests for pipelines. The pipelines may be defined to include any quantity of local and/or remote APIs registered with the system (e.g., APIs 65 of FIG. 1 which are included in API registry 22). APIs 65 of present invention embodiments may be service APIs that perform specific functions (of an overall service) for various types of processing (e.g., concept detection, concept value determination, and negation for Natural Language Processing (NLP), etc.). These types of APIs provide programmable interfaces to services for various applications accommodating different types of consumers. The service APIs are preferably Representational State Transfer (REST) APIs that may communicate via Hypertext Transfer Protocol (HTTP) methods (e.g., GET, POST, PUT, DELETE, etc. utilized by web browsers to retrieve and send data). The REST APIs interface with external systems via Uniform Resource Identifiers/Locators (URIs/URLs) using the HTTP methods.

However, APIs 65 may be associated with any type of entity (e.g., a web-based system, an operating system, a database system, hardware, software, etc.), and may include any quantity of any suitable items (e.g., routines and routine specifications, data structures, object classes, variables, remote calls, protocols, etc.) preferably utilized for constructing applications or other software.

By way of example, a pipeline 240 includes APIs 220A, 220B, and 220C. Each of these APIs may be an individual API registered with the system in API registry 22 and/or included in pipeline catalog 24. The APIs are each initially registered with pipeline 240, and assigned a unique key. Pipeline definitions are created that indicate a unique pipeline key and the keys of the desired APIs in the order in which the APIs are to be executed in the pipeline. By way of example, the pipeline key may be the endpoint URL for an HTTP POST method, thereby allowing the underlying API keys (or the APIs themselves) to be altered without disruption to the pipeline API URL itself. Once defined, the pipeline can be invoked by any entity with access to pipeline manager API 250. The pipeline definitions are preferably centralized in pipeline catalog 24.

Pipeline manager API 250 receives a processing request 205 for pipeline 240. Request 205 may be in a JavaScript Object Notation (JSON) or other format, and is typically in the form of a request object instantiated from the common object model. The request includes a pipeline key 210 identifying pipeline 240, and corresponding data 215 to be processed (e.g., input text, etc.) by the pipeline (e.g., in a container object 320 of the request). The text may be received as plain text or in a JSON object.

The pipeline manager API retrieves the pipeline definition from pipeline catalog 24 based on pipeline key 210 to determine the APIs (e.g., APIs 220A, 220B, 220C) in pipeline 240. As discussed below, the pipeline definition may be a pre-configured pipeline template selected based on representative input text received from a user. Information for the APIs is retrieved from API registry 22. The API information includes the URL for the APIs in order to call or invoke (e.g., initiate or enable execution of) those APIs (e.g., residing on server systems 10). Pipeline manager API 250 calls or invokes each API 220A, 220B, and 220C in the pipeline according to the order specified in the pipeline definition. The pipeline manager API produces a request object for an initial API of the pipeline from the initial request. The request object is preferably in a JSON format, but other formats may be utilized. A request object for a succeeding API is produced based on the response object (e.g., preferably in a JSON format) of the prior API in the pipeline. The request object for a succeeding API may be the response object from the prior API (augmented with the additional information from the prior API), and/or a new object produced from information within the response object. However, the request and response objects conform to the common object model. Alternatively, the APIs may be able to utilize information from any other APIs in the same or different pipelines.

Each API may process input data received in a corresponding request object and modify or augment the request object with data produced by that API to produce a response object with the information of the request object including the modified or augmented information (e.g., an API may augment entities produced by upstream APIs, such as appending entity attributes (e.g., negation=true/false and/or hypothetical=true/false entity attributes)).

The request object for an API (e.g., produced from a response object from a prior API in the pipeline) may be modified (e.g., via serialization module 20) as described below for compatibility with that API. This accommodates the various data needs of (e.g., ensures compatibility with the classes utilized by) each API in the pipeline. Resulting response object 230 provides results of the pipeline.

Pipeline 240 may further include a nested pipeline of APIs 220D. In this case, the nested pipeline may be processed by pipeline manager API 250 in substantially the same manner described above for pipeline 240. For example, nested pipeline 220D may receive a request object produced from the response object of API 220C. The APIs of nested pipeline 220D are determined and invoked based on the pipeline definition for the nested pipeline retrieved from pipeline catalog 24 in substantially the same manner described above. The nested pipeline processes the request object through the nested pipeline APIs, and produces an aggregated response object in substantially the same manner described above. The aggregated response object contains results from the APIs in the nested pipeline aggregated with information in the request object from API 220C. The aggregated response object may serve as resulting response object 230.

The pipeline manager API may accept global and/or API-specific endpoint and query string parameters to be dynamically appended to the underlying APIs of the pipeline definition to provide flexibility. Information for any APIs within a pipeline returning an unsuccessful response code or experiencing an exception at the time of a request may be captured in a log and/or a logging container within the resulting (or aggregated) response object. The pipeline manager API may further capture start/stop times for each underlying API in the pipeline, and return the results within a stop watch container in the resulting (or aggregated) response object. In addition, a pipeline definition may be registered as an API within API registry 22 to enable selection of the pipeline within definitions for other pipelines, thereby providing the nesting of pipelines.

Figure 3:
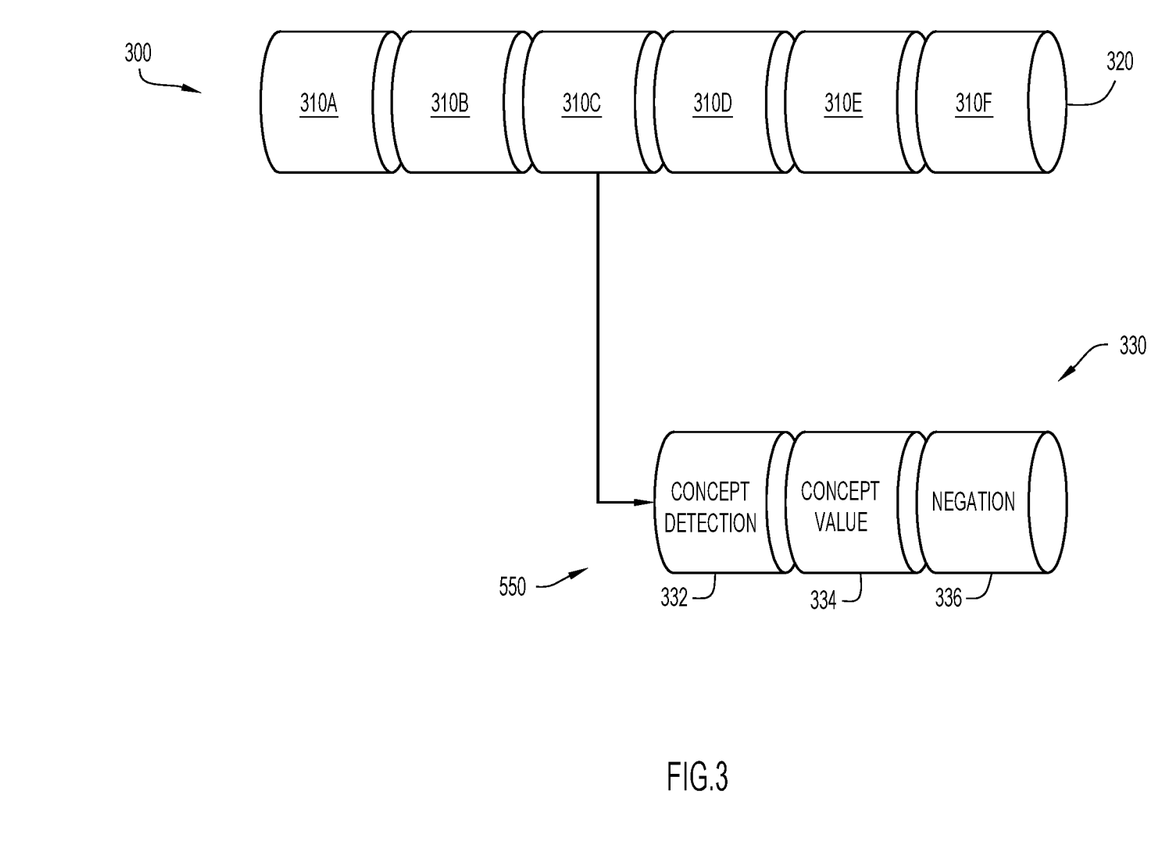
FIG. 3 is a diagrammatic illustration of an example API pipeline according to an embodiment of the present invention.

An example of a pipeline executing a request is illustrated in FIG. 3. Pipeline 320 may be executed as an individual pipeline, or as part of (or nested within) another pipeline as illustrated in FIG. 3. By way of example, a pipeline 300 may include a series of pipeline elements 310*a*-310*f* (e.g. APIs, pipelines, sets of APIs to be executed in parallel, etc.), where a pipeline element 310*c* corresponds to pipeline 330 (e.g., including concept detection API 332, concept value API 334, and negation API 336). As pipeline 320 is executed, a response object produced from element 310*b* (e.g., augmented with data from execution of elements 310*a* and/or 310*b*) may serve as, or be used to produce, a request object that is passed to pipeline element 310*c* (or pipeline 330). Pipeline 330 receives the request object (e.g., augmented with data from pipeline elements 310*a* and/or 310*b*) and produces a corresponding response object augmented with data from execution of pipeline 330 as described below. The information from the response object from pipeline 330 (or element 310*c*) is subsequently passed through remaining pipeline elements 310*d* -310*f*, where these elements may augment the information to produce an aggregated response or results of pipeline 320, which may be evaluated by a user to determine whether to refine pipeline 320 by adding and/or removing one or more pipeline elements, e.g., 310*a*-310*f*.

Pipeline 320 may contain nested pipeline elements. By way of example, pipeline element 310*c* may comprise pipeline 330, which may include a concept detection API 332, a concept value API 334, and a negation API 336. Concept detection API 332 detects concepts within input data, while concept value API 334 leverages the concepts detected by concept detection API 332 in conjunction with the input data to determine values and associate the values with a corresponding detected concept (e.g., a creatinine level of 0.8, etc.). Negation API 336 leverages the input data and augments entities of the concept detection and concept value APIs with an additional parameter indicating whether concepts overlap (e.g., different concepts associated with the same portion of text).

As shown in FIG. 3, example pipeline 330 may include APIs for processing text via Natural Language Processing (NLP), wherein each API performs a specific function that is a portion of the overall processing. A response object is received from pipeline object 310*b* and concept detection API 332 is called or invoked with the response object to detect concepts within the input data, and produces a response object augmented with the detected concepts (e.g.,
the augmented response object includes the input data and detected concepts). Concept value API 334 is called or invoked with the response object (e.g., serving as, or used to produce, a request object and including the input data and detected concepts) to determine values for the detected concepts. Concept value API 334 produces a response object augmented with the values for the detected concepts (e.g., the augmented response object includes the input data, detected concepts, and values for the detected concepts). Negation API 336 is called or invoked with the response object (e.g., serving as, or used to produce, a request object and including the input data, detected concepts, and values for the detected concepts) to determine overlap between the detected concepts. Negation API 336 produces the response object augmented with an additional parameter indicating the overlap or negations (e.g., the augmented response object includes the input data, detected concepts, values for the detected concepts, and negations).

Figure 4:
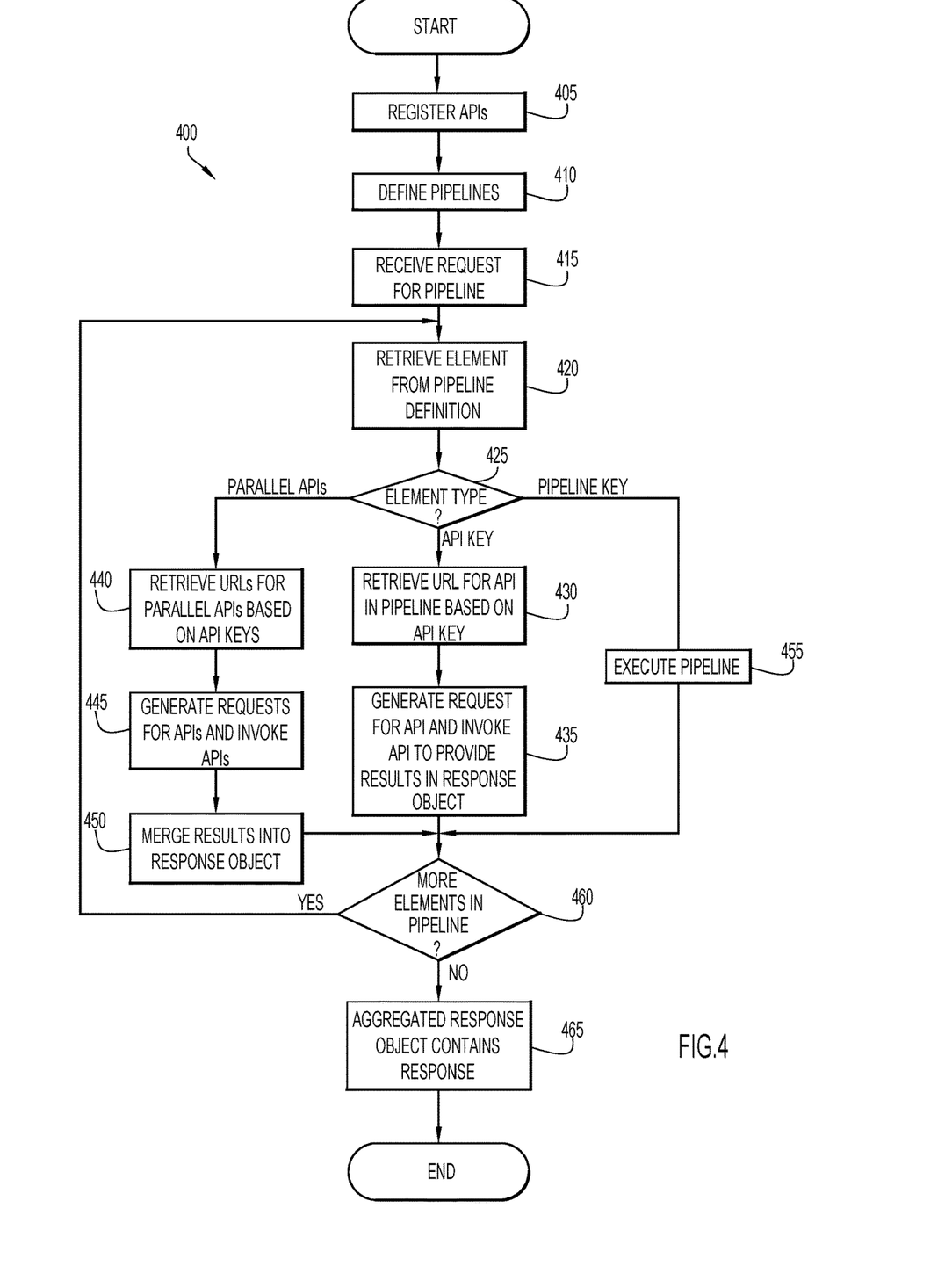
FIG. 4 is a procedural flow chart illustrating a manner of processing input data in an API pipeline according to an embodiment of the present invention.

A manner of processing a pipeline request (e.g. via one or more server systems 10 and pipeline module 16) according to an embodiment of the present invention is illustrated in FIG. 4. Initially, APIs are registered with the system, e.g., in API registry 22, at step 405. The APIs support the common object model for both request and response objects, and a verbose or other mode that enables the API response object to include original content from an API request object (e.g., from pipeline manager API 250). However, an API in a pipeline may not need to support the common object model for both request and response objects and/or the verbose mode when no further APIs exist in the pipeline that need information from prior APIs.

The APIs may be selected for registration and assigned a key from a GUI on a client system 14, or via a command entered on a client system 14 (e.g., which may be generated by a user or by the system from the selection on the GUI). By way of example, an HTTP PUT method may be used to enable a verbose mode for an API, assign an API key, and register the API in API registry 22. The PUT method receives a URL for the API with the corresponding API key and an indication for verbose mode, and another URL for the pipeline manager API with the API key to call or invoke the pipeline manager API to register the API in API registry 22. Example HTTP PUT methods to register APIs may be of the following forms (e.g., issued below via cURL commands (e.g., a command-line tool for transferring data via various protocols), but any types of issuance may be utilized):
(Register Concept Detection API with API Key 'Concept-Detection'):
$ curl -X PUT --header "Content-Type: text/plain" --header "Accept: application/j son" -d
"https://DOMAIN.com/services/concept-detection/api/v1/concepts?verbose=true"
"http://DOMAIN.com/pipeline-manager/api/v1/catalog/api/concept-detection"
(Register Negation API with API Key 'Negation):
$ curl -X PUT --header "Content-Type: text/plain" --header "Accept: application/j son" -d
"https://DOMAIN.com/services/negation/api/v1/negation?verbose=true"
"http://DOMAIN.com/pipeline-manager/api/v1/catalog/api/negation"

The pipeline manager API registers the API by storing the API key and URL in API registry 22. Thus, the API registry includes, for each registered API, the API key and corresponding API URL. For example, API registry 22 may store information of the form (e.g., for APIs api0, api1, and api2):

| (API Key) | (API URL) |
|---|---|
| api-0 >> | https://*.DOMAIN.com/service/api/v1/api0 |
| api-1 >> | https://*.DOMAIN.com/service/api/v1/api1 |
| api-2 >> | https://*.DOMAIN.com/service/api/v1/api2 |

Once the APIs are registered, pipelines are defined at step 410. A pipeline definition may be created via selection of registered APIs from a GUI on a client system 14, or via a command entered on a client system 14 (e.g., which may be generated by a user or by the system from the selection of registered APIs on the GUI). Further, the GUI may provide templates of API pipelines suitable for accomplishing higher-level tasks, where these pipelines may be edited or altered to meet various needs. The pipeline definition indicates a sequence of APIs through which to route data, and the order of the API execution. This may be accomplished by assigning a pipeline key and listing keys of the APIs for the pipeline. The order of API keys in the pipeline definition specifies the order of execution for those APIs in the pipeline. When two or more APIs in the pipeline may be executed in parallel, the keys for these APIs are placed within a set within the pipeline definition to indicate parallel processing of these APIs. The pipeline definition is preferably indicated in a comma separated list (CSL) or comma separated values (CSV) format, but any type of format or notation may be utilized. In addition, a pipeline definition may be listed in pipeline catalog 24 as a pre-configured pipeline template and/or further registered as an API in API registry 22 to enable selection for another pipeline definition to provide nested pipelines.

By way of example, an HTTP PUT method may be used to define a pipeline template and enable placement of the corresponding pipeline template definition in pipeline catalog 24. The PUT method receives the API keys for the pipeline key (in a desired order of execution) and a URL for the pipeline manager API with the pipeline key to call or invoke the pipeline manager API to store the pipeline template definition in pipeline catalog 24. The pipeline key is appended at the end of the URL to create a new endpoint for the pipeline. An example HTTP PUT method for a pipeline template definition may be of the following form (e.g., issued below via cURL commands (e.g., a command-line tool for transferring data via various protocols), but any types of issuance may be utilized):
(Define Concept-Negation Pipeline with Concept-Detection and Negation APIs):
$ curl -X PUT --header "Content-Type: text/plain" --header "Accept: application/j son" -d "concept-detection,negation" "http://DOMAIN.com/pipeline-manager/api/v1/catalog/pipeline/concept-negation"

The pipeline manager API stores the pipeline template definition in pipeline catalog 24. Thus, the pipeline catalog includes, for each pipeline template definition, the pipeline key and corresponding API keys in the order of their execution. For example, pipeline catalog 24 may store information of the form (e.g., for pipelines pipe-0, pipe-1, and pipe-2):

| (Pipeline Key) | (API Keys) |
|---|---|
| pipe-0 >> | api-0, api-1, api-2 |
| pipe-1 >> | {api-0, api-1}, api-2 |
| pipe-2 >> | api-2, pipe-0 |

In this example case, pipeline pipe-0 routes data sequentially through APIs api-0, api-1, and api-2 according to the order of their listing. Pipeline pipe-1 indicates that APIs api-0 and api-1 are to processed in parallel or concurrently based on the set or grouping notation (e.g., "{ }"). Pipeline pipe-1 routes data concurrently through APIs api-0 and api-1, and merges the responses into a response object. The merged response object is routed through API api-2. Pipeline pipe-2 includes a pipeline nested within this pipeline. In this case, the pipeline definition for nested pipeline pipe-2 may be registered as an API within API registry 22. Thus, data is routed through API api-2 and pipeline pipe-0 (e.g., APIs api-0, api-1, and api-2).

A request for executing a pipeline is received at step 415. The request indicates the pipeline key, and further includes or provides an indication for a request object of the common object model, where input data resides in a corresponding container object. By way of example, an HTTP POST method may be used to execute the pipeline. The POST method receives input text for the pipeline and a URL for the pipeline manager API with the pipeline key (e.g., as the endpoint of the URL). An example POST method for pipeline execution may be of the following form (e.g., issued below via a cURL commands (e.g., a command-line tool for transferring data via various protocols), but any type of issuance may be utilized):
curl -X POST --header "Content-Type: text/plain" --header "Accept: application/j son" -d "Patient has no history of diabetes."
"http://DOMAIN.com/pipeline-manager/api/v1/pipeline/concept-negation"

In this example case, the concept-negation pipeline is executed with the input text "Patient has no history of diabetes".

The pipeline key indicated in the request is utilized to access the corresponding pipeline definition from pipeline catalog 24, and an element in the pipeline definition is retrieved at step 420. The pipeline definition may include one or more elements and the order of their execution in the pipeline. An element of the pipeline definition may include an API key, a pipeline key, or a set of keys of APIs to be executed in parallel. The elements of the pipeline definition are preferably separated by a delimiter within the pipeline definition (e.g., commas in the comma separated list or values formats, etc.).

When the retrieved element is an API key as determined at step 425, the API key is used to retrieve API information from API registry 22 at step 430. The API information includes the URL (or location) of the API to be executed. A request object for the API is generated at step 435, where the request object conforms to the common object model. The request object for an initial element of the pipeline may be produced from the initial request (e.g., when no response object exists from a prior element in the pipeline), while a request object for a succeeding element is produced based on the response object of the prior element in the pipeline. The request object for a succeeding element may be the response object from the prior element (augmented with the additional information from the prior element), and/or a new object produced from information within the response object. However, the request and response objects conform to the common object model.

Since each API may have different classes and/or data needs, the request object may be modified to accommodate these differing needs. Serialization module 20 accommodates additions and/or extensions of the common object model within the produced request object that are unrecognized by the corresponding API (e.g., not in a classpath of that API).

For example, the request object may be in a JSON format, where objects specified in the JSON format are converted to JAVA or other objects (e.g., Plain Old Java Objects (POJO), etc.) by an API for processing. The JAVA or other objects are converted back to JSON by the API to produce the corresponding response object containing results from the API. If a container and/or entity in the request object (or JSON) is not recognized by the API, the unrecognized container and/or entity cannot be converted into the corresponding object for use by the API.

Accordingly, containers and/or entities that are not recognized by an API are deserialized (e.g., in JSON) to an additional container (e.g., UnknownContainer) and/or entity (e.g., UnknownEntity) of the request object (and subsequently reproduced in the corresponding response object) by serialization module 20, thereby preserving the data for APIs of downstream elements. In other words, the data for these unrecognized containers and entities are moved to (or placed within) other (or separate) storage areas of the request object (and corresponding response object). Attributes of the unrecognized containers and/or entities are preferably stored in the form of key-value pairs, but any desired format may be utilized. This enables the containers and entities in the request object (e.g., JSON) to be converted to the corresponding objects (e.g., POJOs) by the API (e.g., the API sees only containers and entities that may be recognized (and ignores the additional data)), while saving the additional or unrecognized data (in the request and corresponding response objects) for other APIs in the pipeline that may recognize that data. Similarly, data from these other areas may be incorporated into existing containers and/or entities of the request object (and corresponding response object) for other APIs that can recognize this data.

The serialization module may further provide aliases (e.g., in JSON, etc.) of entity types in the request object rather than utilizing fully qualified class names (e.g., "conceptValue" may be used as an alias instead of using the corresponding lengthy class name, "common.service.entity.concept.model.ConceptValue"). In addition, the serialization module may reconcile explicit attributes with other attributes within a given entity and flatten these attributes in the request object (e.g., JSON). The serialization module accommodates attributes for a given entity that have been modified to be explicit or non-explicit.

Once the request object is generated, the API is called or invoked using the URL to perform the corresponding function, and provide results in the response object. The pipeline manager API may accept global and/or API-specific endpoint and query string parameters to be dynamically appended to the URL of the API to provide flexibility. When additional elements in the pipeline definition exist as determined at step 460, the next element is retrieved for processing at step 420.

When the retrieved element is a set of keys for APIs to be executed in parallel as determined at step 425, the API keys are used to retrieve API information from API registry 22 at step 440. The API information includes the URL (or location) of the APIs to be executed in parallel. Request objects for the APIs are generated at step 445, where the request objects conform to the common object model. The request objects for an initial element of the pipeline may be produced from the initial request (e.g., when no response object exists from a prior API in the pipeline), while request objects for a succeeding element of the pipeline are produced based on the response object of the prior element in the pipeline. The request objects for a succeeding element may be the response object from the prior element (augmented with the additional information from the prior element), and/or new objects produced from information within the response object. However, the request and response objects conform to the common object model. Serialization module 20 accommodates container and/or entity extensions of the request objects that are unrecognized by the APIs (e.g., not in a classpath of that API) as described above.

The APIs are called or invoked using the URLs to perform the corresponding functions in parallel. The pipeline manager API may accept global and/or API-specific endpoint and query string parameters to be dynamically appended to the URLs of the APIs to provide flexibility as described above. The response objects of the parallel APIs containing the results are merged and stored in a response object at step 450. When additional elements in the pipeline definition exist as determined at step 460, the next element is retrieved for processing at step 420.

When the retrieved element is a pipeline key as determined at step 425, the pipeline is executed at step 455 in substantially the same manner described above (e.g., for steps 420 to 460) to produce the response object with results from pipeline execution. Since a pipeline may include two or more levels of pipeline nesting, the pipeline processing described above may be recursively performed to determine results. When additional elements in the pipeline definition exist as determined at step 460, the next element is retrieved for processing at step 420.

The succeeding elements in the pipeline are processed as described above until each element has been processed as determined at step 460. As each element (e.g., API, set of APIs to be executed in parallel, pipeline, etc.) in the pipeline is executed, response objects are successively augmented with additional information from that element. The resulting or aggregated response object from execution of each element in the pipeline is provided as the response object for the pipeline execution at step 465. Alternatively, the final element in the pipeline may produce output in addition to, or instead of, a response object (e.g., render a HyperText Markup Language (HTML) page or other document, etc.). According to a present embodiment, the response object and/or HTML page or other document is rendered on client systems 14 to enable a user to review the response object and/or HTML page or other document to determine whether to add and/or remove one or more element (e.g., API, set of APIs to be executed in parallel, pipeline, etc.) from the pipeline.

Figure 5:
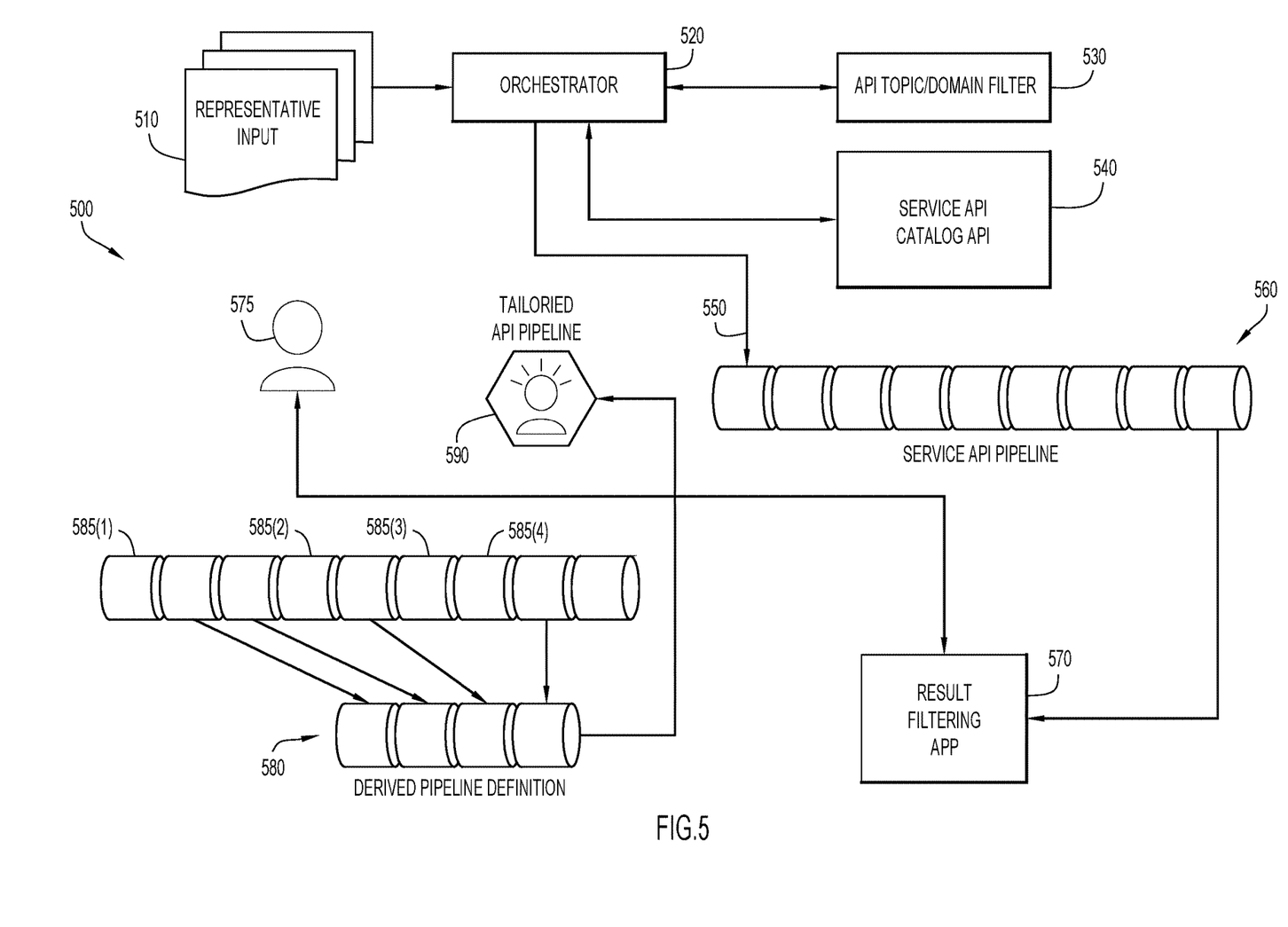
FIG. 5 is a flow diagram illustrating a process of dynamically generating a pipeline of filtered application programming interfaces according to an embodiment of the present invention.

FIG. 5 illustrates a process 500 of dynamically generating a pipeline of filtered application programming interfaces. Initially, a user uploads input data to server systems 10 representative of the type and/or context associated with data that the user wants to process using an API service pipeline at step 510.

Orchestrator 26, in server systems 10, forwards the representative input data to API filter 28 to identify one or more primary classifications and/or one or more sub-classifications associated with the representative input data at step 530. For example, API filter 28 may use context-based and/or imaging analysis techniques (e.g., NLP, object-based image analysis, image segmentation, object recognition, etc.) to analyze the representative input data to identify one or more contexts associated with the representative input data (e.g., business, legal, financial, etc.) and correlate the one or more contexts with one or more primary classifications and/or one or more sub-classifications (e.g., contracts, journal articles, patents, etc.). API filter 28 may further comprise a trained document classifier that identifies one or more primary classifications and/or one or more sub-classifications that may be associated with the representative input data. For example, using the trained document classifier, API filter 28 may be able to analyze representative input data and determine whether the input data comprises a patent law journal article or one or more patent documents, and, accordingly, identify one or more primary classifications and/or one or more sub-classifications related to either the patent law journal article or one or more patent documents.

In response to receiving the one or more primary classifications and/or one or more sub-classifications associated with the representative input data from API filter 28, orchestrator 26 may search one or more service API catalogs and/or service pipeline catalog 24 to identify and select a pre-constructed template pipeline and/or one or more available service APIs associated with the primary and/or sub-classifications for processing the representative input data at step 540. According to an embodiment, the one or more service API catalogs may comprise a curated list of available service APIs that are registered in API registry 22. According to a further embodiment, orchestrator 26 may search the one or more service API catalogs using tag-based or index-based search techniques to identify one or more service APIs related to the representative input data and therefore appropriate for processing the input data. Accordingly, orchestrator 26 may select one or more APIs in a service API catalog and/or one or more pre-constructed template pipelines from service pipeline catalog 24 based on one or more classifications associated with the representative input data.

Orchestrator 26 may further identify and select a pre-constructed template pipeline and/or one or more service APIs for processing representative input data based on whether the pre-constructed template pipeline and/or one or more service APIs are typically used to process information associated with one or more classifications related to the representative input data. For example, API filter 28 may determine that the representative input data comprises one or more medical histories and/or records and, accordingly, orchestrator 26 may select a pre-constructed pipeline from service pipeline catalog 24 appropriate for processing and/or analyzing medical histories and/or records.

According to an embodiment, orchestrator 26 may periodically search API registry 22 and/or one or more service API catalogs for one or more service APIs related to a specific input data format and/or context (e.g., medical, legal, financial, etc.). Based on the search results, orchestrator 26 may further construct and/or update one or more template pipelines associated with a specific input data format and/or context by appending one or more service APIs to an existing template pipeline registered in service pipeline catalog 24 or chaining together one or more service APIs to construct a template pipeline for processing documents related to the specific format and/or context.

Orchestrator 26 may forward the representative input data, along with a request to process the representative input data, to an API service pipeline selected and/or constructed by orchestrator 26 at step 550. The selected API service pipeline may process the representative input data, in a manner as shown in FIG. 4, to generate a response object based on the representative input data at step 560, and may forward the generated response object to client systems 14 for visualization to a user at step 570. According to an embodiment, the visualization of the response object may be generated by an API appended to the end of the API service pipeline and/or may be rendered by a stand-alone application executed on client systems 14.

The user may evaluate the response object displayed in a user visualization on client systems 14 (e.g., in an annotation viewer), and provide feedback concerning whether the service pipeline definition should be refined (e.g., by adding, removing and/or updating one or more APIs) at step 575. According to an embodiment, the user visualization may comprise a list of APIs included in a selected service pipeline and/or structured text produced by the selected service pipeline based on representative input data. A user therefore may evaluate a response object displayed in a user visualization and provide feedback to orchestrator 26 to refine (e.g., by adding, removing and/or updating one or more APIs) a service pipeline to process a document and/or input data such that the response object produced by the service pipeline satisfies one or more user requirements, preferences and/or specifications. For example, a user may refine a service API pipeline definition based on one or more entities (e.g., text, images, pictures, etc.) and/or relations between the one or more entities (e.g., same primary and/or sub-classification, etc.) included in a response object produced by the API service pipeline processing the input data and displayed in a user visualization.

A user may further examine one or more input formats associated with one or more APIs registered in an API catalog to refine a service pipeline definition (e.g., by adding, removing and/or updating, one or more APIs) based on a format and/or context associated with the representative input data. For example, if the representative input data is related to nephrology, a user may identify and select one or more APIs associated with medicine and/or nephrology (e.g., kidney diseases, dialysis treatments, etc.) to be included in the associated service API pipeline definition.

According to a further embodiment, a user may specify and/or configure one or more parameters associated with one or more APIs included in a selected service pipeline and/or corresponding entities of interest to the user (e.g., text, images, pictures, etc.) to be detected within a document and/or input data processed by the selected service pipeline. For example, if a user uploads input data related to nephrology, a user may configure one or more APIs such that an API service pipeline processes the input data by annotating only entities (e.g., text, images, pictures, etc.) associated with kidney disease (e.g., types, symptoms, causes, treatments, etc.).

Based on the feedback received from a user, orchestrator 26 may refine the service pipeline definition (e.g., by adding, removing and/or updating one or more APIs from the service pipeline) to construct a user-derived pipeline definition at step 580. For example, as shown in FIG. 5, orchestrator 26 may, based on user feedback, remove APIs 585(1), 585(2), 585(3) and 585(4) from the service pipeline definition to construct a tailored pipeline definition. According to an embodiment, orchestrator 26 may automatically revise, e.g., without user feedback, a service pipeline definition based on an analysis of an output and/or response object generated by the service pipeline (e.g., by comparing the output and/or response object with a reference output, etc.).

Orchestrator 26 may register the tailored pipeline definition in service pipeline catalog 24 at step 590 and process 500 ends. According to an embodiment, orchestrator 26 may store information associated with the tailored pipeline definition (e.g., pipeline keys, user identification information, etc.), facilitating further API pipeline processing of input data received from one or more users.

Figure 6:
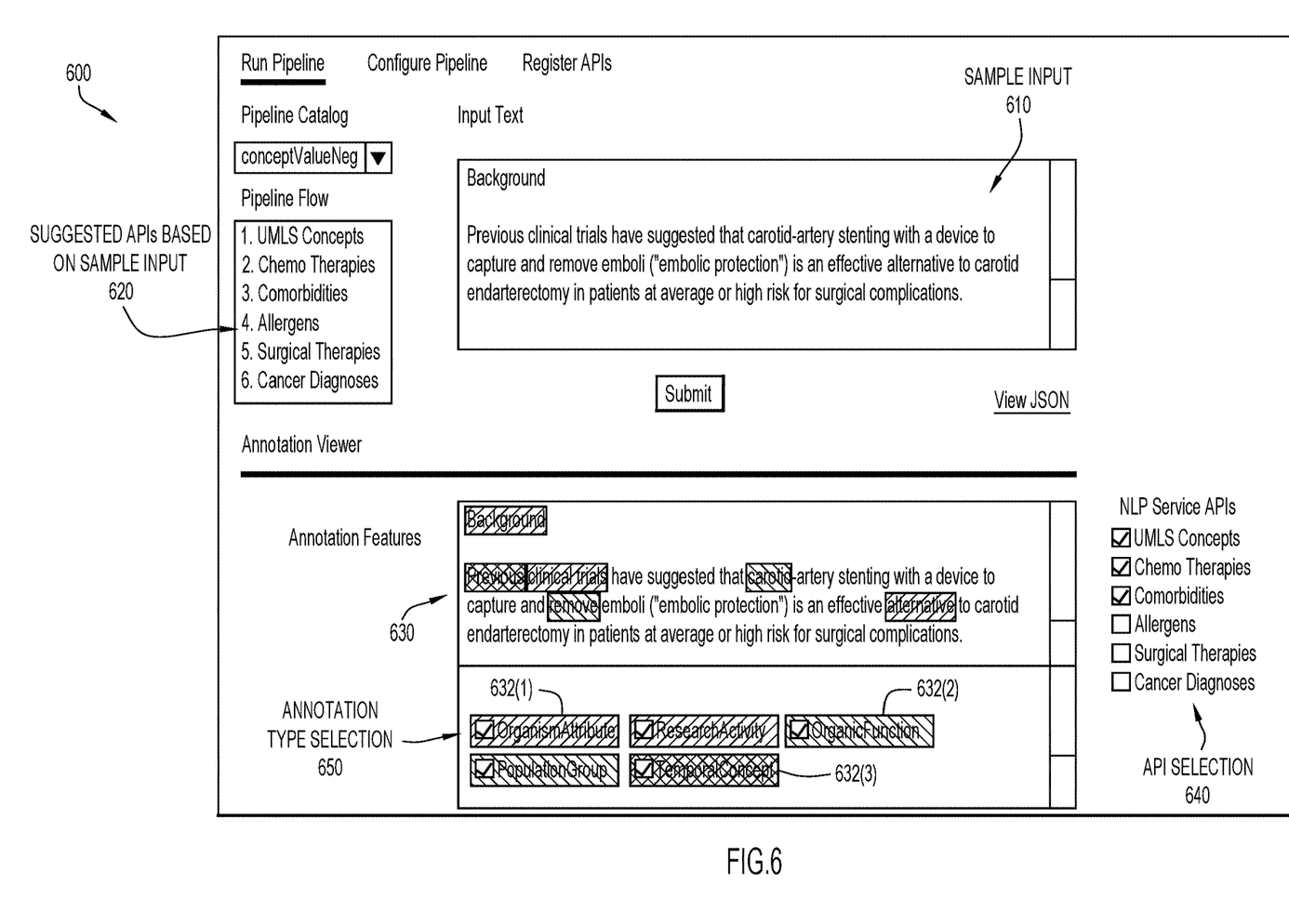
FIG. 6 is a diagrammatic illustration of an example user visualization generated by the process of FIG. 5 according to an embodiment of the present invention.

FIG. 6 illustrates an example user visualization 600 generated in FIG. 5 and displayed on client systems 14 according to an embodiment of the present invention. User visualization 600 may comprise sample input 610, suggested API list 620, annotated input text 630, API selection checkbox 640 and annotation type selection 650.

As shown in FIG. 6, sample input 610 may display input data uploaded to orchestrator 26 for API pipeline processing, e.g., representative input data. Similarly, suggested API list 620 may display one or more APIs identified by orchestrator 26 as being related to sample input 610 and therefore selected by orchestrator 26 for pipeline processing. Annotated input text 630 may comprise one or more annotations, e.g., background colors, of one or more textual elements included in sample input 610, such that a user may correlate the one or more textual elements in sample input 610 with one or more primary classifications and/or sub-classifications displayed in annotation type selection 650. For example, as further shown in FIG. 6, the textual elements "clinical trials," "alternative," "trial," "enrollment," and "randomization" in sample input 610 may comprise annotations that correlate the textual elements with classifications "OrganismAttribute" and "ResearchActivity" included in annotation type selection 650.

API selection checkbox 640 may include one or more APIs selected by orchestrator 26 to process input sample 610 along with checkboxes corresponding to each of the one or more selected APIs, enabling a user to select and/or unselect the APIs included in a tailored API pipeline definition. A user therefore may use the checkboxes in API selection checkbox 640 to provide feedback to orchestrator 26 as to the constituent APIs included in a tailored pipeline definition. According to an embodiment, when a user selects the APIs applied to sample input 610, e.g., by checking or unchecking one or more of the checkboxes included in API selection checkbox 640, the annotations displayed in annotated input text 630 are modified in real-time. For example, if a user removes the "UMLS Concepts" API from the service pipeline definition, the annotations associated with the "UMLS Concepts" API in annotated input text 630 may be removed and/or modified.

Accordingly, a user may observe and evaluate, in real-time, the changes to both annotated input text 630 and annotation type selection 650 caused by removing one or more APIs from suggested API list 620. A user therefore may interact with user visualization 600 to provide real-time feedback to dynamically generate and/or refine a service API pipeline definition tailored to any granularity consistent with the user's specific requirements, preferences and/or needs. For example, a user may refine a service API definition based on one or more entities (e.g., text, images, pictures, etc.) and/or relations between the one or more entities (e.g., primary and/or sub-classifications, etc.) selected by the user, e.g., in API selection checkbox 640, and displayed in annotated input text 630 of user visualization 600.

Figure 7:
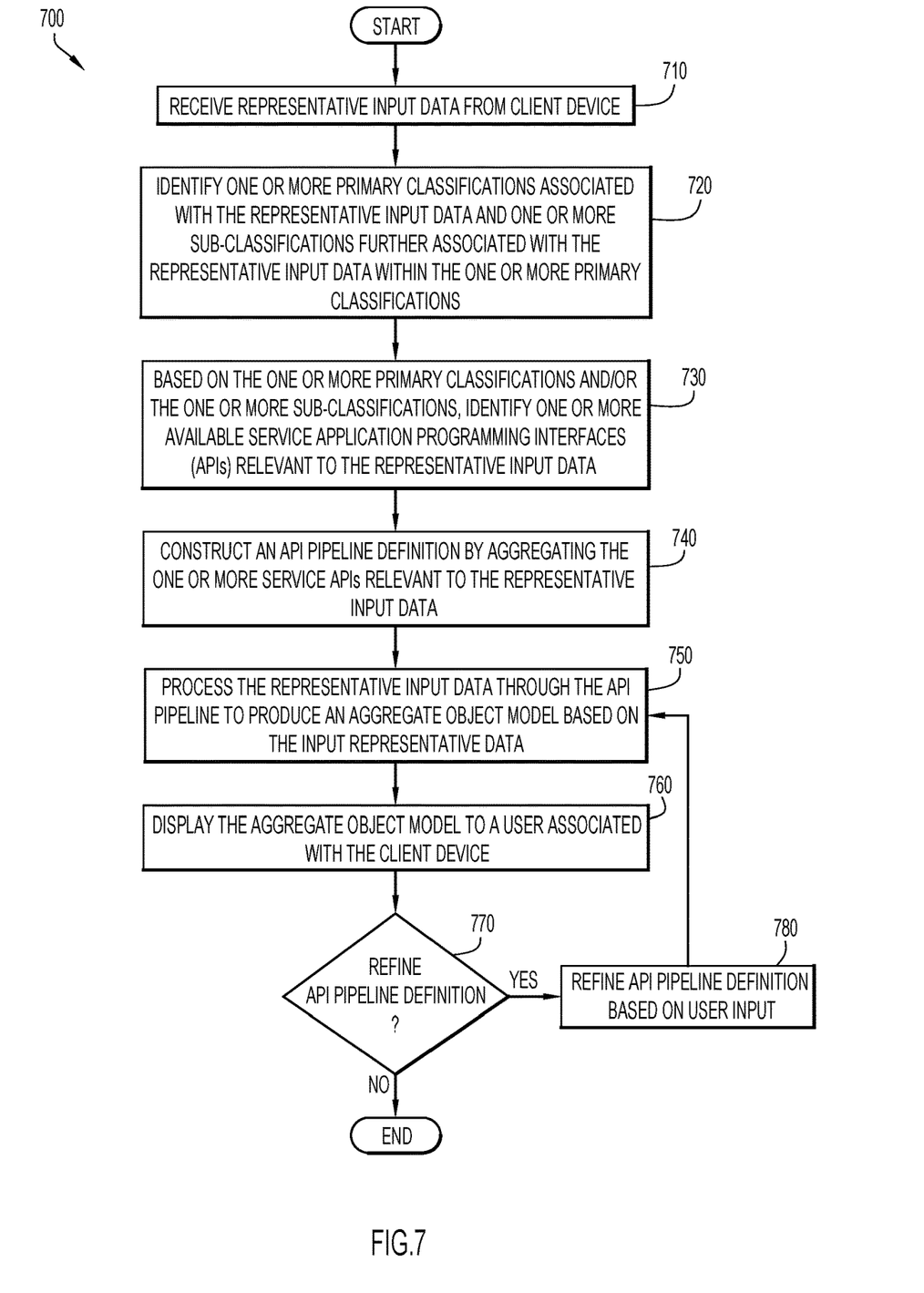
FIG. 7 is a procedural flow chart illustrating a manner in which a pipeline of filtered application programming interfaces is dynamically generated according to an embodiment of the present invention.

With reference to FIG. 7, there is depicted a procedural flow chart illustrating a method 700 to dynamically generate a pipeline comprising filtered application programming interfaces according to an embodiment of the present invention.

At step 710, initially, server systems 10 receives representative input data from client systems 14.

At step 720, server systems 10 identifies one or more primary classifications associated with the representative input data and one or more sub-classifications further associated with the representative input data within the one or more primary classifications.

At step 730, based on the one or more primary classifications and/or the one or more sub-classifications, server systems 10 identifies one or more available service APIs relevant to the representative input data.

At step 740, server systems 10 constructs an API pipeline definition by aggregating the one or more service APIs relevant to the representative input data.

At step 750, server systems 10 processes the representative input data through the API pipeline to produce an aggregate object model based on the input representative data.

At step 760, client systems 14 displays the aggregate object model to a user associated with the client systems.

At step 770, if the user determines that the API pipeline definition should be refined, the API pipeline definition is refined based on user input at step 780, e.g., by adding, removing and/or updating one or more APIs, and operations return to step 750, where server systems 10 process the representative input data through the refined API pipeline to produce a revised aggregate object model.

If, however, the user determines that the API pipeline definition should not be refined, method 700 ends.

It will be appreciated that the embodiments described above and illustrated in the drawings represent only a few of the many ways of implementing embodiments for dynamically generating a pipeline comprising filtered application programming interfaces.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., serialization module, orchestrator, API filter, etc.). These systems may include any types of monitors and input devices (e.g., keyboard, mouse, voice recognition, etc.) to enter and/or view information.

It is to be understood that the software (e.g., pipeline module, serialization module, orchestrator, API filter, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., serialization module, orchestrator, API filter, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store service pipeline definitions, API keys and/or user configuration information. The database system may be implemented by any number of any conventional or other databases, data stores or storage structures (e.g., files, databases, data structures, data or other repositories, etc.) to store information (e.g., client device configuration settings, keys for registered APIs, service pipeline definitions, etc.). The database system may be included within or coupled to the server and/or client systems. The database systems and/or storage structures may be remote from or local to the computer or other processing systems, and may store any desired data (e.g., client device configuration settings, keys for registered APIs, service pipeline definitions, etc.).

The present invention embodiments may employ any number of any type of user interface (e.g., Graphical User Interface (GUI), command-line, prompt, etc.) for obtaining or providing information (e.g., input text, API selection, annotation type selection, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user (e.g., input text, API selection, annotation type selection, etc.).

The present invention embodiments are not limited to the specific tasks or algorithms described above, but may be utilized to generate any API pipelines and to perform any type of service API pipeline processing on any type of user data (e.g., personal, business, legal, financial, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating and executing a sequence of a plurality of application programming interfaces comprising:
    filtering a collection of application programming interfaces based on input data representing information of a document to be processed, wherein filtering the collection of application programming interfaces comprises:
        examining input formats of the application programming interfaces to filter the collection of application programming interfaces based on formats of the input data;
    generating a pipeline of filtered application programming interfaces, wherein each filtered application programming interface is sequentially executed within the pipeline;
    processing the document through the pipeline and generating visualizations based on the processing of the document; and
    refining the pipeline to produce desired data selected within the visualizations.

2. The method of claim 1, wherein refining the pipeline comprises:
    specifying parameters for an application programming interface and corresponding entities to be detected within the document.

3. The method of claim 1, wherein the input data includes descriptive information providing requirements for processing the document, and refining the pipeline comprises:
    refining the pipeline to process the document to satisfy the requirements.

4. The method of claim 1, wherein the visualizations include annotations.

5. The method of claim 1, wherein refining the pipeline includes:
   identifying application programming interfaces from the collection for selection based on the visualizations; and
   refining the pipeline based on the selected application programming interfaces.

6. The method of claim 1, wherein the desired data includes one or more from a group of entities and relations selected from the visualizations of the processed document.

\* \* \* \* \*